United States Patent
Markel et al.

(10) Patent No.: US 12,164,054 B2
(45) Date of Patent: Dec. 10, 2024

(54) RADAR INTERFERENCE REDUCTION TECHNIQUES FOR AUTONOMOUS VEHICLES

(71) Applicant: Waymo LLC, Mountain View, CA (US)

(72) Inventors: Matthew Markel, Mountain View, CA (US); Timothy Campbell, Mountain View, CA (US); Alessandro Temil, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 242 days.

(21) Appl. No.: 17/092,665

(22) Filed: Nov. 9, 2020

(65) Prior Publication Data
US 2022/0390550 A1 Dec. 8, 2022

(51) Int. Cl.
*G01S 7/02* (2006.01)
*G01S 13/931* (2020.01)

(52) U.S. Cl.
CPC ............ *G01S 7/023* (2013.01); *G01S 13/931* (2013.01)

(58) Field of Classification Search
CPC ........ G01S 7/023; G01S 13/931; G01S 7/021; G01S 13/867; G01S 7/0231; G01S 7/0232; G01S 7/0235; G01S 13/44; G01S 13/58; G01S 2013/9316; G01S 2013/93273; G01S 2013/93274; G01S 3/465; G01S 3/50; G01S 7/003
See application file for complete search history.

(56) References Cited

U.S. PATENT DOCUMENTS 10,830,867 B2 * 11/2020 Lin ........................... G01S 7/40
2009/0121918 A1 * 5/2009 Shirai ..................... G01S 7/023
342/159

(Continued)

OTHER PUBLICATIONS

M. Kozy, J. Yu, R. M. Buehrer, A. Martone and K. Sherbondy, "Applying Deep-Q Networks to Target Tracking to Improve Cognitive Radar," 2019 IEEE Radar Conference (RadarConf), Boston, MA, USA, 2019, pp. 1-6, doi: 10.1109/RADAR.2019.8835780. (Year: 2019).*

*Primary Examiner* — Olumide Ajibade Akonai
*Assistant Examiner* — Yonghong Li
(74) *Attorney, Agent, or Firm* — McDonnell Boehnen Hulbert & Berghoff LLP

(57) ABSTRACT

Example embodiments relate to methods and systems for implementing radar electronic support measure operations. A vehicle's processing unit may receive information relating to electromagnetic energy radiating in an environment of the vehicle that is detected using a vehicle radar system. The electromagnetic energy originated from one or more external emitters, such as radar signals transmitted by other vehicles. The processing unit may determine a spectrum occupancy representation that indicates spectral regions occupied by the electromagnetic energy and subsequently adjust operation of the vehicle radar system based on the spectrum occupancy representation to reduce or mitigate interference with the external emitters in the vehicle's environment. In some examples, the vehicle radar system may be switched to a passive receive-only mode to measure the electromagnetic energy radiating in the environment from other emitters.

20 Claims, 10 Drawing Sheets

(56) References Cited

U.S. PATENT DOCUMENTS

| | | | | |
|---|---|---|---|---|
| 2016/0061935 A1* | 3/2016 | McCloskey | ............ | G01S 7/4008 |
| | | | | 342/82 |
| 2016/0349354 A1* | 12/2016 | Yomo | .................... | G01S 13/931 |
| 2020/0322752 A1* | 10/2020 | Eggert | ................. | H04L 5/0048 |
| 2020/0393536 A1* | 12/2020 | Stettiner | ................. | H04B 1/715 |
| 2021/0063566 A1* | 3/2021 | Smith | .................... | G06V 20/58 |
| 2021/0116560 A1* | 4/2021 | Gulati | .................... | G01S 13/426 |
| 2021/0208272 A1* | 7/2021 | Lavian | .................... | H03L 7/091 |

\* cited by examiner

RADAR INTERFERENCE REDUCTION TECHNIQUES FOR AUTONOMOUS VEHICLES

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for detecting and measuring electromagnetic energy that originated from one or more external emitters in the environment of an autonomous vehicle, such as radar signals transmitted by other vehicle radar systems positioned nearby. The techniques may be used by the vehicle to analyze the electromagnetic energy in the area and enable subsequent operation of the vehicle radar system to be adjusted in real-time to increase performance by decreasing potential interference with the radiating electromagnetic energy and/or to further understand the vehicle's environment to enhance autonomous navigation.

In one aspect, an example method is provided. The method involves receiving, at a computing system coupled to a vehicle, information relating to electromagnetic energy radiating in an environment of the vehicle and detected using a vehicle radar system. The electromagnetic energy originated from at least one external emitter. The method further involves, based on the information relating to the electromagnetic energy, determining a spectrum occupancy representation that indicates one or more spectral regions occupied by the electromagnetic energy, and adjusting, by the computing system, operation of the vehicle radar system based on the spectrum occupancy representation.

In another aspect, an example system is provided. The system includes a vehicle having a vehicle radar system and a computing device. The computing device is configured to receive information relating to electromagnetic energy radiating in an environment of the vehicle and detected using a vehicle radar system. The electromagnetic energy originated from at least one external emitter. The computing device is also configured to determine a spectrum occupancy representation that indicates one or more spectral regions occupied by the electromagnetic energy based on the information relating to the electromagnetic energy and adjust operation of the vehicle radar system based on the spectrum occupancy representation.

In yet another example, an example non-transitory computer readable medium having stored therein program instructions executable by a computing system to cause the computing system to perform functions is provided. The functions may involve receiving information relating electromagnetic energy radiating in an environment of the vehicle and detected using a vehicle radar system. The electromagnetic energy originated from at least one external emitter. The functions may also involve determining a spectrum occupancy representation that indicates one or more spectral regions occupied by the electromagnetic energy based on the information relating to the electromagnetic energy and adjusting operation of the vehicle radar system based on the spectrum occupancy representation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
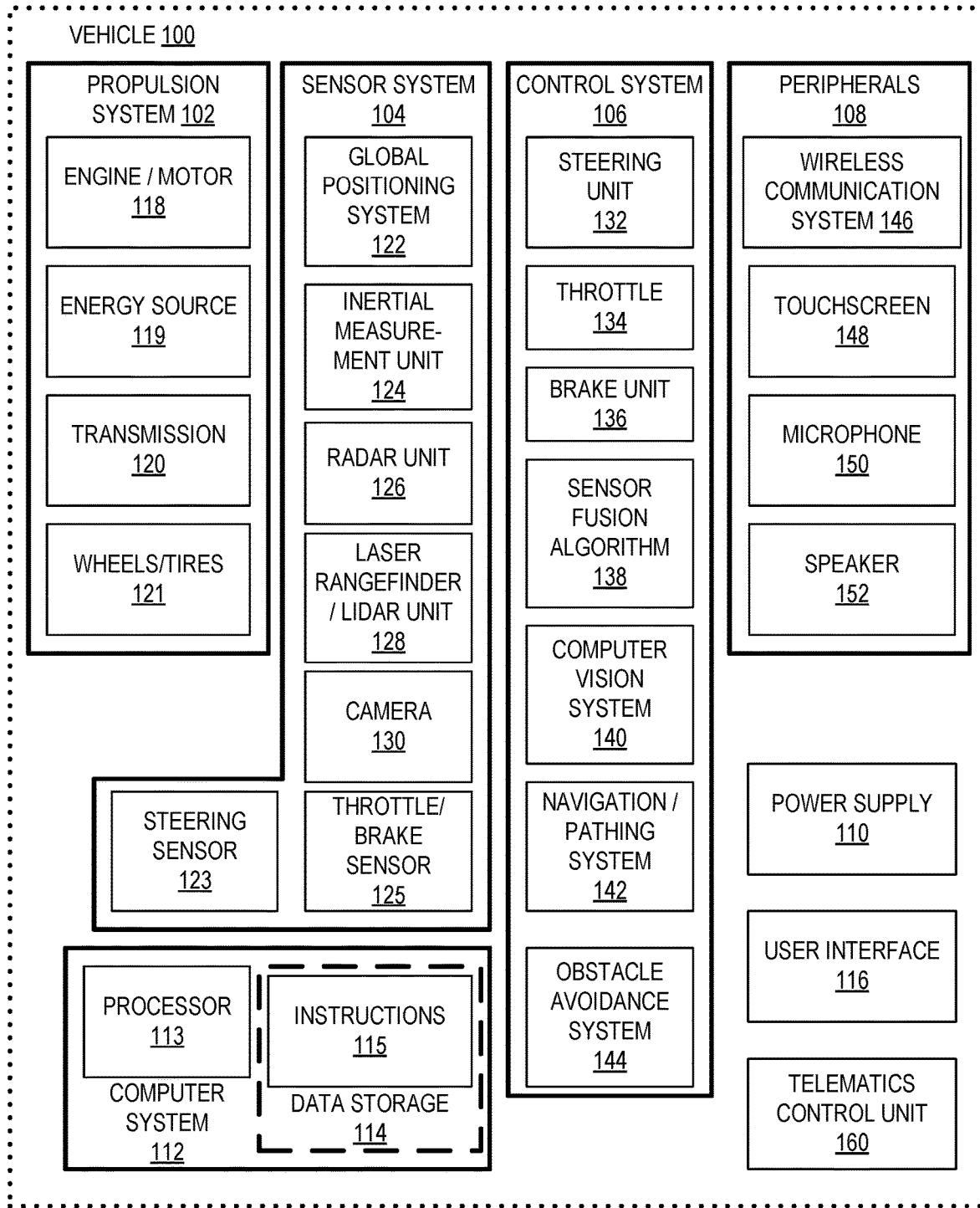
FIG. 1 is a functional block diagram illustrating a vehicle, according to one or more example embodiments.
Figure 2A:
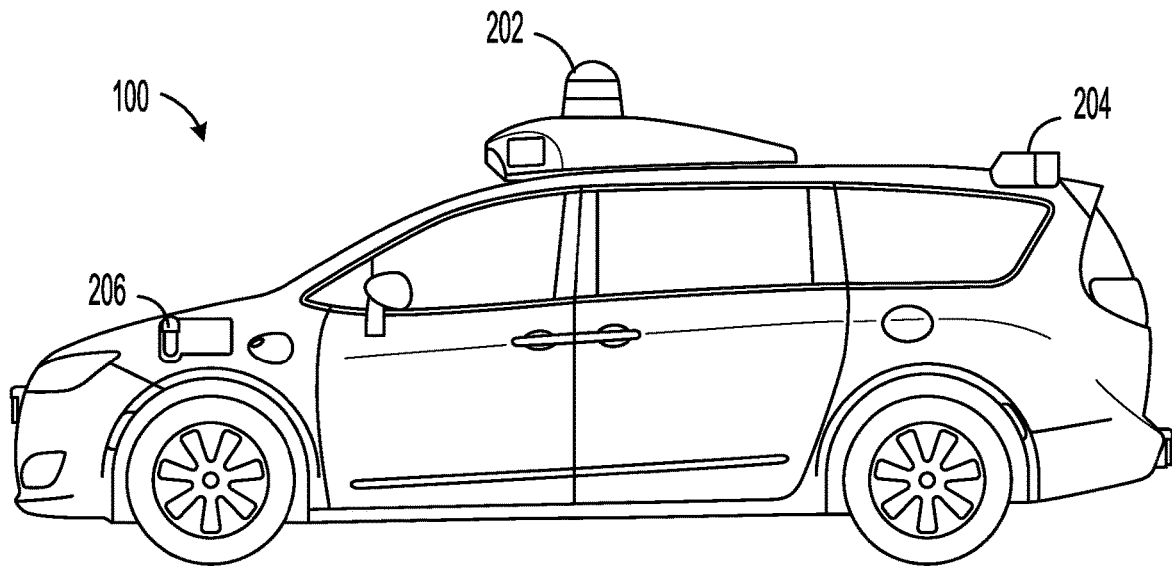
FIG. 2A illustrates a side view of a vehicle, according to one or more example embodiments.
Figure 2B:
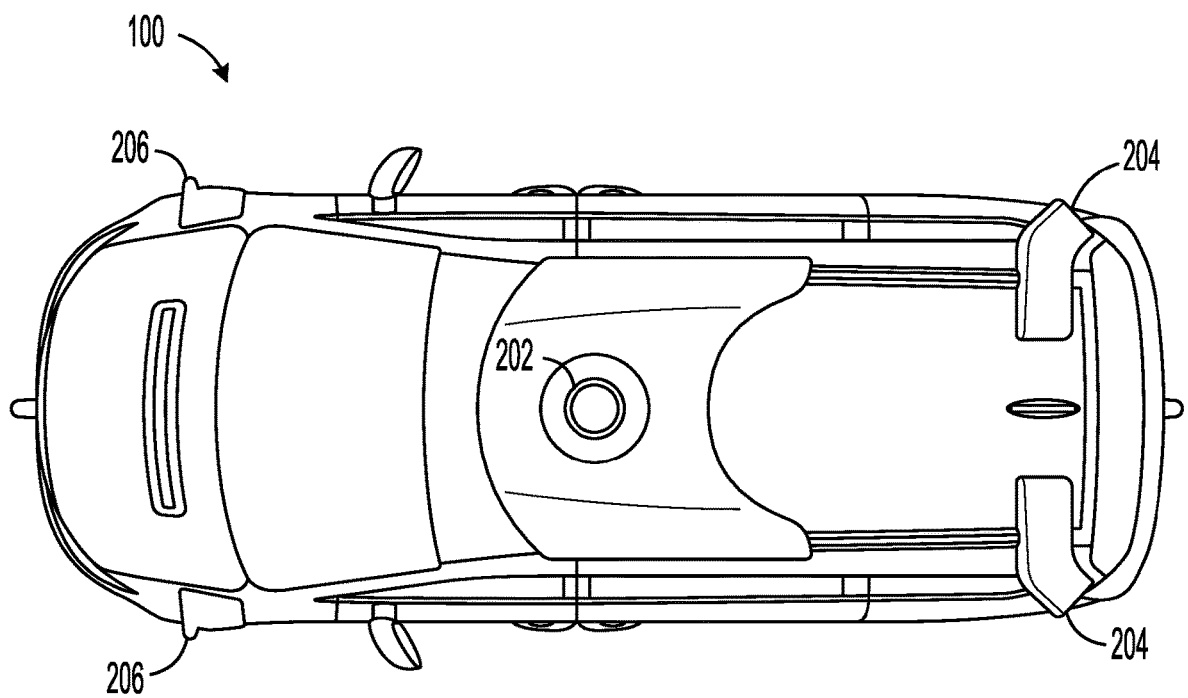
FIG. 2B illustrates a top view of a vehicle, according to one or more example embodiments.
Figure 2C:
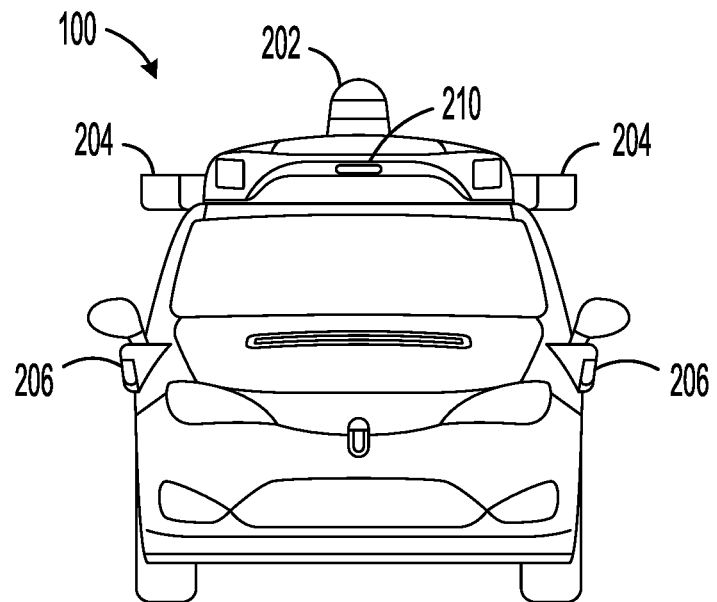
FIG. 2C illustrates a front view of a vehicle, according to one or more example embodiments.
Figure 2D:
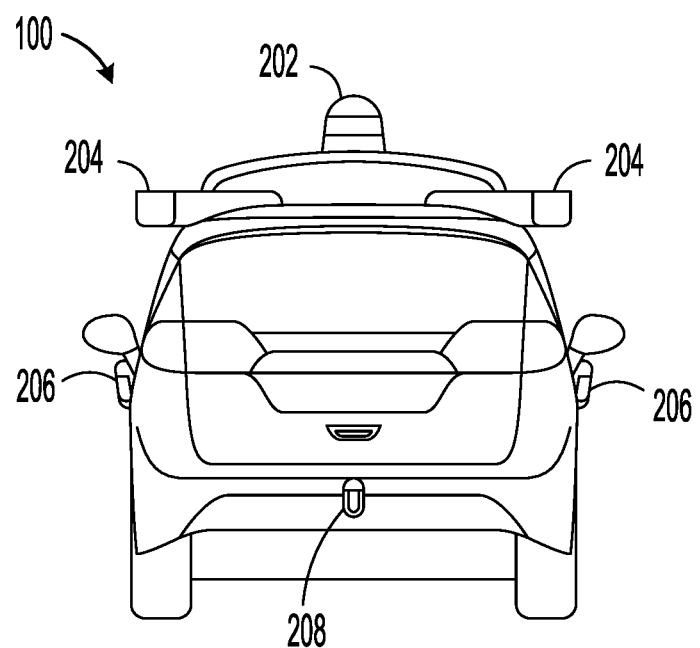
FIG. 2D illustrates a back view of a vehicle, according to one or more example embodiments.
Figure 2E:
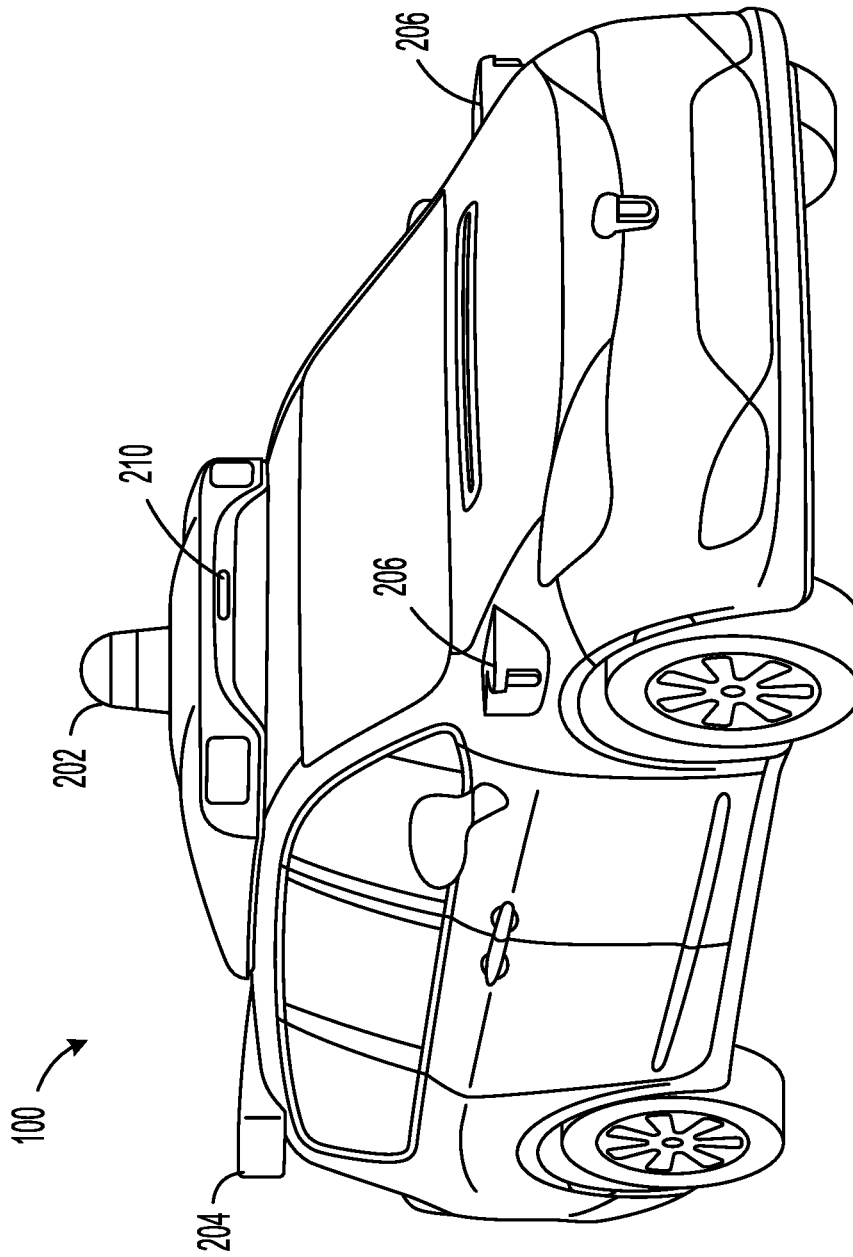
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or more antennas (radiating elements) to emit radar signals into an environment, which can enable subsequent measurements of aspects of the environment. In particular, upon coming into contact with surfaces in the environment, the radar signals can scatter in multiple directions with some of the radar signals penetrating into some surfaces while other radar signals reflect off surfaces and travel back towards one or more reception antennas of the radar system. A radar processing system (or another processing unit) may process the radar reflections to generate two dimensional (2D) and/or three dimensional (3D) measurements that represent aspects of the environment, such as the positions, orientations, and movements of nearby objects and other surfaces occupying the environment near the radar system.

Because a radar system can be used to measure distances and motions of nearby objects and other surfaces, vehicles are increasingly incorporating vehicle radar systems to generate measurements during navigation that can assist with vehicle navigation, obstacle avoidance, and in other ways that can boost overall vehicle safety. For instance, a vehicle may use radar to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the position of traffic signs and signals.

In some applications, a vehicle radar system is used to assist a driver controlling the vehicle. For instance, radar measurements may be used to generate alerts when the vehicle drifts outside its lane, when the vehicle travels too closely to another vehicle or object, and/or in other ways that can help the driver. Radar measurements can also be used to help enable autonomous or semi-autonomous operations by the vehicle. Particularly, radar can be used along with other sensor measurements to help an autonomous vehicle understand its environment and detect changes in the environment in near real-time as discussed above.

Typical vehicle radar systems are designed to operate within 5 Gigahertz (GHz) of spectral region that extends between 76 GHz and 81 GHz, inclusive. Although the 5 GHz spectral region offers plenty of bandwidth to accommodate a single vehicle radar system, issues can arise when multiple vehicle radar systems are operating in the same general location. In particular, because each vehicle radar system may be transmitting radar signals at frequencies between 76 GHz and 81 GHz in the same general environment, interference can occur between radar signals from different radar systems. Interference occurs when two (or more) radars in relatively close proximity are operating on the same frequency or frequencies and can negatively impact radar reflection processing for both radar systems. As such, interference can disrupt a vehicle radar system and decrease the system's ability to measure aspects of the surrounding environment.

With the number of vehicles that radar continuing to increase overall, vehicle radar systems are more likely to encounter interference during navigation within various environments, especially in cities and other areas with dense populations that typically have more vehicles navigating in multiple directions. Thus, there clearly exists a need to be able to avoid or at least decrease the potential negative impacts (e.g., interference) that can arise when multiple vehicle radar systems are operating in the same environment.

Example embodiments presented herein relate to radar interference reduction techniques that can be executed to enhance the performance of a vehicle radar system by reducing potential interference with other nearby vehicle radar systems and other types of external emitters. An example radar interference reduction technique may initially involve a vehicle radar system detecting and measuring the electromagnetic energy (e.g., radar signals) traversing in the environment that originated from one or more external emitters. For example, the vehicle radar system may be switched to a passive receive-only mode to be able to only receive radar signals that originated from emitters other than the vehicle radar system itself. By measuring the electromagnetic energy transmitted by other emitters in the same general location, the vehicle radar system may develop an understanding of the spectral region (e.g., the frequencies) that are currently occupied by radar signals transmitted by other vehicles. The vehicle radar system (or another processing unit) can subsequently use this understanding of electromagnetic energy in the area to adjust operations of the vehicle radar system and/or other vehicle operations. For example, the vehicle radar system may be adjusted to subsequently transmit radar signals with different parameters to reduce potential interference. The vehicle radar system can modify timing, frequency, duration, and/or other aspects of transmitted radar signals. In addition, the understanding of electromagnetic energy in the environment can also be used to modify the vehicle's navigation strategy and/or to perform other operations using the measurements of the electromagnetic energy, such as identifying the locations of other vehicles using radar and factoring the locations into the vehicle's navigation strategy in real-time.

As a vehicle navigates, the vehicle's radar system may periodically survey and quantify the occurrence of emitters and interference in the automotive radar band (e.g., between 76 GHz and 81 GHz, inclusive). A processing unit may use measurements from the vehicle radar system to determine a real time view of the spectrum occupancy in the vehicle's general location. The spectrum occupancy representation can be used to detect if any potential interference may arise due to electromagnetic energy radiating in the area, which can enable a processing unit to adjust vehicle radar system operations to avoid one or more impacted channels. For example, measurements of external radiating energy can be used to find a region of the automotive radar spectral region that is unoccupied, which can then be subsequently used by the vehicle radar system to avoid interference. In some instances, a processing unit may analyze the spectrum occupancy representation developed based on the vehicle's current location and subsequently identify one or more patterns of interference that can minimize interference (or are compatible with interference mitigation of the radar). The processing unit may also adjust polarization used by the vehicle radar system based on information corresponding to electromagnetic energy in the environment.

A vehicle radar system may use multiple receive apertures (antennas) to receive electromagnetic waves radiating in the vehicle's environment. For instance, the vehicle radar system may use antennas (e.g., a linear array of antennas) on one or more radar units coupled to the vehicle to receive radiating electromagnetic waves in the area that originated from one or more external emitters. By using multiple receive apertures, a processing unit may analyze the received electromagnetic waves to determine a line of bearing to the emitter. For example, the processing unit may use a Frequency Difference of Arrival (FDOA) process and/or a Time Difference of Arrival (TDOA) process to determine a location of the external emitter (e.g., another vehicle) that transmitted the electromagnetic energy relative to the vehicle's position, which can then be factored as part of the navigation strategy.

In some instances, the vehicle may direct one or more sensors toward an external emitter to gather further information about the external emitter. For example, the vehicle may capture one or more images of the vehicle transmitting the radar signals and subsequently associate the spectral regions (e.g., the frequencies) of the radar signals with that make and model of vehicle. Over time, the vehicle may develop signatures that identify different emitters (e.g., manufacturer and mode) based on performing iterations of interference reduction techniques in different environments. For instance, a signature may indicate one or more parameters, such as the type of emitter (e.g., vehicle radar system or another type of source), modulation duration, bandwidth, spectral region, frequency, linear frequency modulated (LFM) waveform ramp slope, and/or ramp repetition rate. The vehicle may communicate signatures and other information to other vehicles and/or a central system, which may enable other vehicles to access and use the information during navigation. For instance, the central system may maintain a library that includes signatures for different vehicle types. In some embodiments, information from a fleet of vehicles may be used to develop signatures that identify different emitters. For example, the information from the fleet of vehicles can be pooled to develop a database of signatures that can be used to identify radar parameters associated with vehicles based on vehicle make and models.

In some examples, radar interference techniques are performed locally by one or more processing units onboard a vehicle. For example, the vehicle radar system may periodically switch to a receive-only mode that enables radar units to measure radar signals in the environment that did not originate at the vehicle radar system. This way, the vehicle radar system may detect any other emitters operating nearby and enable one or more processing units onboard the vehicle to subsequently adjust operations to reduce potential interference.

In other examples, radar interference techniques are executed using assistance from one or more external computing devices. For example, each vehicle may communicate with a central system to obtain information that can supplement the performance of a radar interference technique locally at the vehicle. In addition, one or more external computing devices may perform processing techniques and communicate with local processing units positioned on the vehicle in some cases.

Furthermore, some examples may involve techniques performed by radar systems that are not coupled to a vehicle. For instance, a structurally-independent radar system may be used in an example by having a location situated near an intersection that enables the radar system and a corresponding processing unit to develop signatures for various vehicle radar systems. The developed signatures and other information can then be provided to vehicle radar systems for subsequent use during navigation. For instance, a vehicle may detect a particular make and model of vehicle using a camera and modify operations of the onboard radar system based on the signature for that make and model of vehicle without having to perform a radar interference reduction technique.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Based on the shape and the materials of the corresponding waveguides, the distribution of propagating energy can vary at different locations within a radar unit, for example. The shape and the materials of the waveguides can define the boundary conditions for the electromagnetic energy. Boundary conditions are known conditions for the electromagnetic energy at the edges of the waveguides. For example, in a metallic waveguide, assuming the waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. In addition, each mode has an associated cutoff frequency. A mode is not supported in a waveguide if the electromagnetic energy has a frequency that is below the cutoff frequency. By properly selecting both (i) dimensions and (ii) frequency of operation, electromagnetic energy may propagate through the waveguides in specific modes. The waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
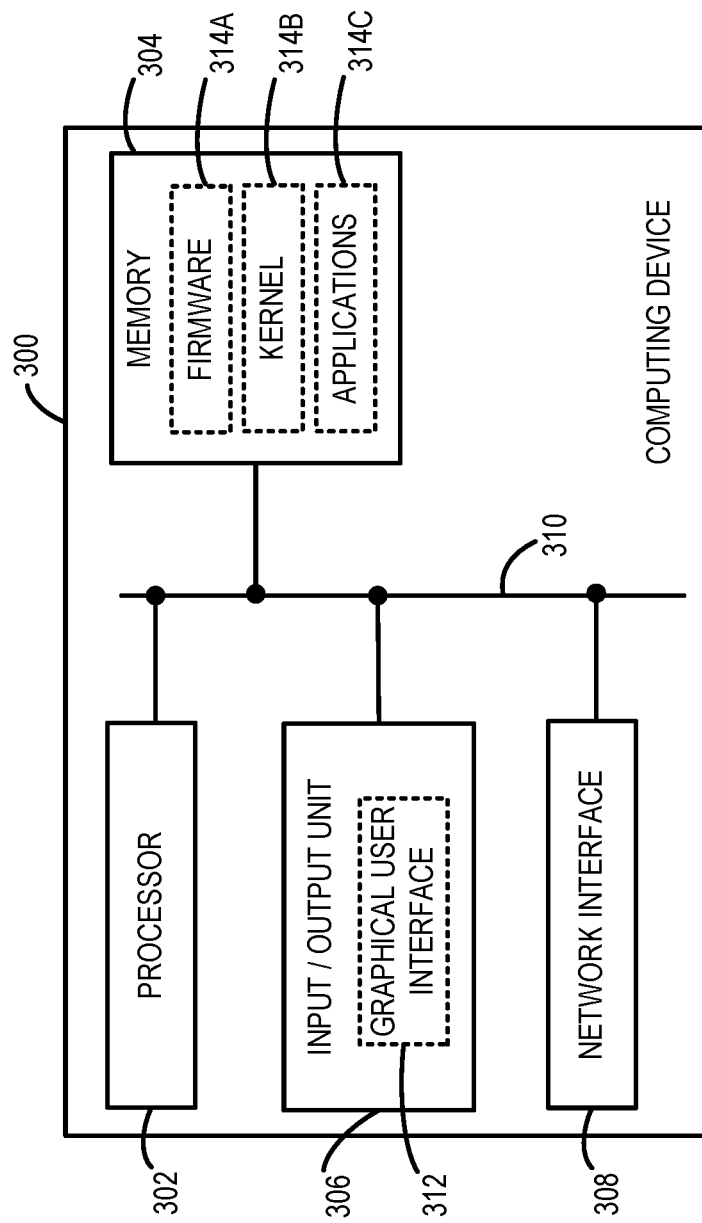
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
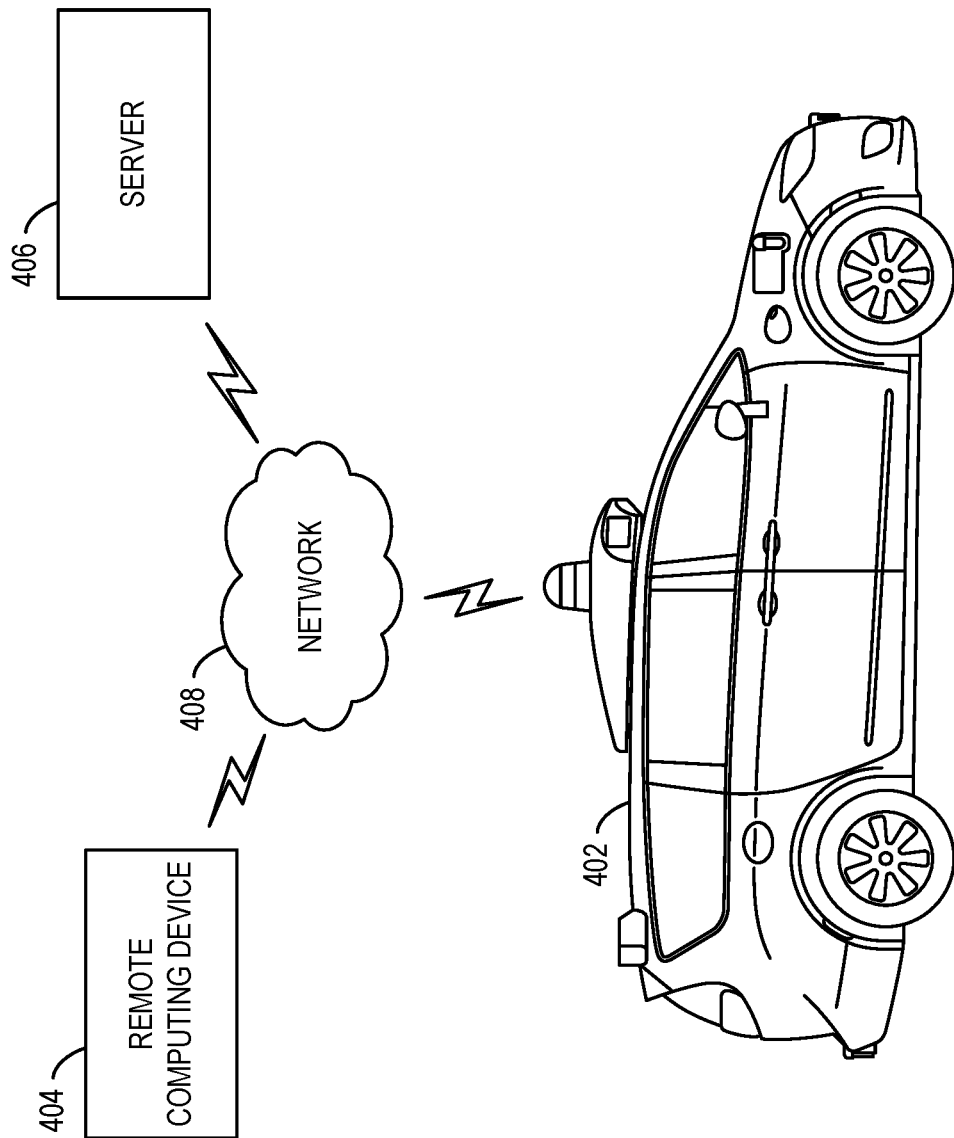
FIG. 4 is a system for wireless communication between a vehicle and computing devices, according to one or more example embodiments

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in the autonomous mode, vehicle 402 may navigate and pick up and drop off passengers (or cargo) between desired destinations by relying on sensor measurements to understand the surrounding environment. In some embodiments, vehicle 402 can operate as part of a fleet, which may be managed by a central system (e.g., remote computing device 404 and/or other computing devices).

Remote computing device 404 may represent any type of device configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle, 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to radar interference reduction techniques described herein. For example, vehicle 402 may communicate signatures determined for different types of vehicles or other emitters in the environment to server 406 for storage and subsequent access by other vehicles. Similarly, vehicle 402 may also access emitter signatures and other stored information from server 406. This way, vehicle 402 may use signatures determined by other vehicles during navigation, which can supplement local performance of radar reduction techniques in some instances.

In addition, remote computing device 404 may be configured to perform processing on sensor data obtained by the vehicle radar system and/or other sensors of vehicle 402. For instance, remote computing device 404 may use deep learning (e.g., an artificial neural network) to detect trends within sensor data captured by vehicle sensors from multiple vehicles navigating different environments. The trends may be used to associate certain bandwidths (e.g., spectral regions) and/or other parameters with particular vehicles and/or emitters.

Figure 5:
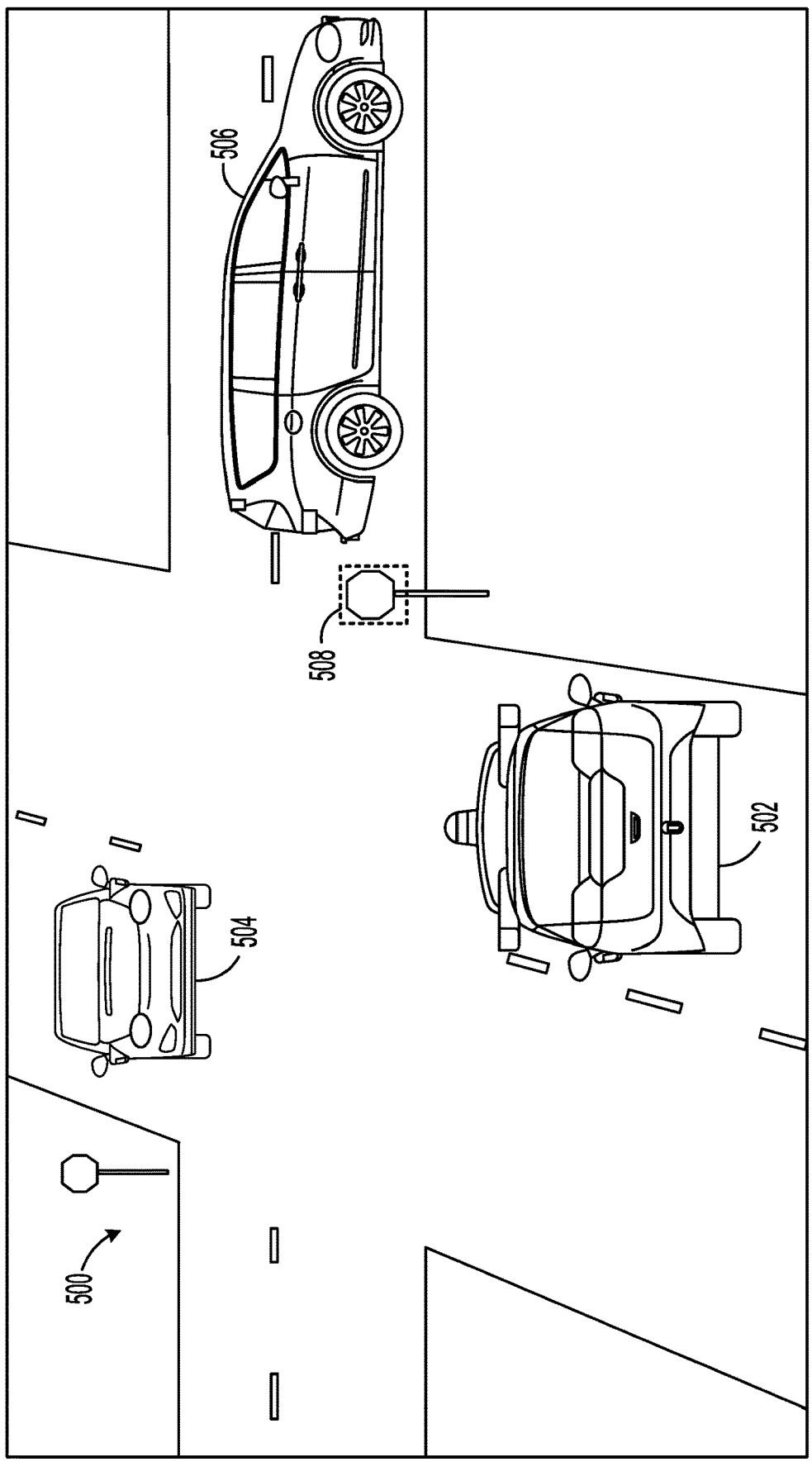
FIG. 5 depicts a scenario involving a vehicle radar system performing an interference reduction technique, according to one or more example embodiments

FIG. 5 depicts a scenario involving a vehicle radar system performing an interference reduction technique, according to one or more example embodiments. Scenario 500 illustrates vehicle 502 navigating in an environment that is also occupied by vehicle 504 and vehicle 506. In particular, vehicle 502 is shown slowing down to stop at an intersection in accordance with stop sign 508, while vehicle 504 is shown stopped on the other side of the intersection relative to vehicle 502. Vehicle 506 is also located nearby vehicle 502. Due to the relative proximity between vehicles 502-506, the vehicle radar system of each vehicle may perform less than optimal due to interference caused by the other vehicle radar systems.

In the example embodiment shown in FIG. 5, it is assumed that each vehicle 502-506 includes a vehicle radar system having at least one emitter configured to emit electromagnetic energy in the form of the radar signals into the environment to illustrate vehicle 502 performing an example interference reduction technique. Vehicles 502-506 may represent different makes and models of vehicles that may use radar for autonomous or semi-autonomous operations. In other embodiments, vehicle 502 may perform an analysis of the environment and determine that neither vehicle 504 nor vehicle 506 is using radar in a way that reduces the usefulness of the vehicle radar system or other sensors used by vehicle 502. For instance, the vehicle radar system of vehicle 502 may analyze the general location to measure the spectral region or regions being used by other emitters in the area and determine that there are not currently any emitters transmitting electromagnetic waves in a way that impacts the performance of radar or other sensors of vehicle 502. As such, vehicle 502 may continue navigation and repeat the analysis process to detect if the changing environment now includes any emitters that may cause interference.

The vehicle radar system of vehicle 502, alone or in combination with another processing unit, may be configured to perform one or more interference reduction techniques described herein upon encountering scenario 500. As vehicle 502 navigates, one or more processing units may cause the vehicle radar system of vehicle 502 to periodically and/or continuously monitor the environment for electromagnetic energy traversing from other emitters that are external to vehicle 502. For example, the vehicle radar system may cyclically switch one or more of its radar units to a passive receive-only mode that enables antennas on the radar units to detect and receive radar signals from other vehicles in the environment (e.g., vehicle 504 and vehicle 506). In some embodiments, the vehicle radar system of vehicle 502 may switch modes and passively receive radar signals from vehicles 504, 506 in response to detecting vehicle 504 and/or vehicle 506 via a sensor (e.g., cameras).

In addition, in some examples, the passive receive-only mode may require the entire vehicle radar system 502 to temporarily stop emitting radar signals to enable the reception of electromagnetic waves from external sources only. As such, the vehicle radar system may be configured to quickly change modes to ensure safe navigation. In some examples, the vehicle radar system may only switch modes to the passive receive-only mode when vehicle 502 is not moving (i.e., stopped), such as at stop sign 508.

The vehicle radar system or another processing unit may use received radar signals to quantify the occurrence of emitters and interference in the automotive band (e.g., the inclusive spectral region between 76 GHz and 81 GHz). For example, a processing unit may determine a spectrum occupancy representation that can provide a real time view (frequency versus time) of the spectrum occupancy in the general area of vehicle 502. Other spectral regions (e.g., frequencies) may be analyzed within examples. For instance, the processing unit may determine a spectrum occupancy representation based on a 24 GHz spectral region and/or 120 GHz in other embodiments.

The vehicle radar system of vehicle 502 may be configured to adjust operations to reduce potential interference with vehicles 504 and 506. Particularly, upon detecting that one or both vehicles 504-506 are transmitting radar signals that may impact the performance of the vehicle radar system of vehicle 502, a processing unit may be configured to execute one or more of the adjustment techniques described herein. For example, the vehicle radar system of vehicle 502 (and/or another processing unit) may find a region of the spectrum that is currently unoccupied (or minimally occupied relative to other regions of the spectrum) and select that region for use during subsequent transmission of radar signals. In some instances, the vehicle radar system (and/or another processing unit) may identify patterns of interference that can minimize interference during operation or are compatible with interference mitigation. For example, the vehicle radar system may implement a fast up-ramping radar mode that is compatible with a fast down ramping radio frequency interference. Similarly, the vehicle radar system of vehicle 502 may use a different modulation scheme. For instance, the vehicle radar system may use phase modulated and/or pulse waveforms as an interference mitigation strategy.

In addition, a processing unit associated with vehicle 502 may use measurements of detected radar signals from vehicle 504 and/or vehicle 506 to determine geolocations for one or both vehicle 504 and vehicle 506 relative to vehicle 502. For example, the processing unit may use measurements of radar signals emitted by vehicle 504 to determine a line of bearing to vehicle 504. In particular, the vehicle radar system may use multiple receive antennas on one or more radar units to receive radar signals that originate at vehicle 504. By using multiple reception apertures, the vehicle radar system can subsequently determine the line of bearing to vehicle 504 using a Frequency Difference of Arrival (FDOA) process and/or a Time Difference of Arrival (TDOA) process. Other techniques may be used to geolocate the position of an emitter relative to vehicle 502. In addition, vehicle 502 may perform a similar process to determine a position of vehicle 506 relative to vehicle 502.

Vehicle 502 may use measurements of signals produced by nearby emitters to enhance autonomous operations. For example, vehicle 502 may use the detection of radar signals from vehicle 504 and/or vehicle 506 and information derived based on the detection of these radar signals to supplement other sensor data from other vehicle sensors.

In some embodiments, vehicle 502 may communicate a spectrum occupancy representation in near-real time to one or more devices positioned externally from vehicle 502. Particularly, vehicle 502 may share the spectrum occupancy representation and an indication of the spectral region or regions that its vehicle radar system will use to transmit radar signals with one or both of vehicles 504-506. This way, vehicles 504, 506 may adjust operations to avoid interference based on the indication and spectrum occupancy representation received from vehicle 502.

Vehicle 502 may determine further information about vehicles 504, 506 in response to measuring radar signals that originated from each vehicle. For example, a processing unit may identify the particular spectral region or regions which one or both vehicles 504, 506 are transmitting radar signals within and supplement the spectral region identifications with images of each vehicle. Over time, vehicle 502 may use machine learning, neural networks, or other techniques to learn to associate certain spectral region or regions (e.g., frequencies) of radar signal transmission with particular makes and models of vehicles. For example, vehicle 502 may determine that vehicles from one manufacturer tend to operate in one or more spectral regions centered around 80 GHz while vehicles from a different manufacturer tend to operate in one or more spectral regions centered around 77 GHz. Thereafter, vehicle 502 may leverage this information and automatically adjust vehicle radar operations in response to detecting vehicles from each manufacturer without reliance on measuring radar signals upon detecting the vehicles.

Signatures for emitters can be generated based on other parameters of emission as well, such as modulation duration, bandwidth, spectral region occupied, linear frequency modulated (LFM) waveforms, modulation duration, bandwidth, modulation type, modulation parameters, FM ramp rates, phase code chip rates, pulse repetition rates, and ramp repetition rates, among other possible parameters. In addition, a signature determined for an emitter may be based on a combination of multiple parameters.

In some embodiments, some processing of the radar signals or information derived based on the radar signals may occur remotely from vehicle 502. Particularly, information determined by vehicle 502 can be communicated to a central system (e.g., a cloud platform) similar to system 400 shown in FIG. 4, which can subsequently use the information from vehicle 502 as well as information from other vehicles to generate a database that uses the information from numerous vehicles to determine trends. As indicated above, signatures can be determined for certain makes and/or models of vehicles based on radar measurements received passively and processed. As such, the central system may share the signatures for various makes and models of vehicles with vehicle 502 and other vehicles enabling each vehicle to identify what bandwidth(s), spectral region(s), and/or frequency or frequencies are likely occupied within a region based on the makes and models of vehicles in the region (which can be identified using a camera and image processing).

Figure 6:
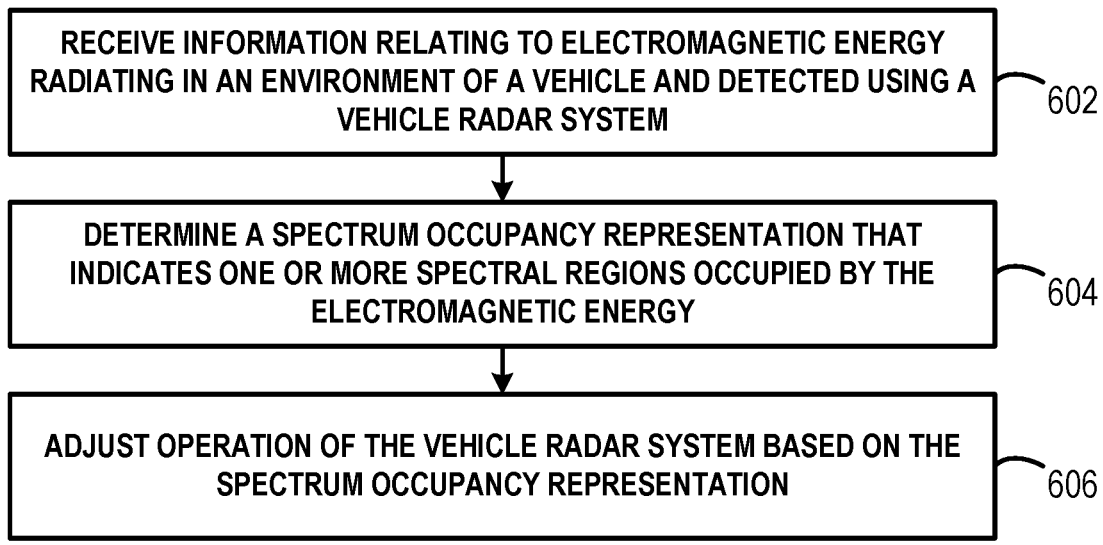
FIG. 6 is a flow chart of a method for implementing an interference reduction technique, according to example embodiments.

FIG. 6 is a flowchart of example method 600 for operating a radar system, according to one or more embodiments. Method 600 may include one or more operations, functions, or actions, as depicted by one or more of blocks 602, 604, and 606, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 602, method 600 involves receiving information relating to electromagnetic energy radiating in an environment of a vehicle and detected using a vehicle radar system. The electromagnetic energy originated from one or more external emitters, such as from other vehicles operating nearby the vehicle. The vehicle may also encounter non-vehicle emitters in different environments during navigation.

In some embodiments, the vehicle radar system may switch one or more radar units (or the entire system) to a passive receive-only mode in order to only receive the electromagnetic energy radiating in the environment from other emitters. For instance, the vehicle radar system may be configured to switch to the passive receive-only mode for a threshold duration (e.g., 5-10 milliseconds) to detect any electromagnetic energy. Other example threshold durations can be used. In some instances, the threshold duration can differ depending on if the vehicle radar system detects any electromagnetic energy in the area or not. In addition, the vehicle radar system may detect electromagnetic energy traversing the environment in different ways, such as pulse radar and continuous wave radar.

In some cases, switching the vehicle radar system to the passive receive-only mode involves switching the vehicle radar system to the passive receive-only mode for a threshold duration based on a predefined cycle. The predefined cycle may indicate when to switch the vehicle radar system between an environment measure mode and the passive receive-only mode.

At block 604, method 600 involves determining a spectrum occupancy representation that indicates one or more spectral regions occupied by the electromagnetic energy. For example, the vehicle radar system or another computing device may determine the spectrum occupancy representation based on a spectral range between 76 GHz and 81 GHz, inclusive. The spectrum occupancy may be determined based on the information relating to the electromagnetic energy.

In some cases, the spectrum occupancy representation may resemble a histogram that indicates where detected electromagnetic energy in an area occupies across the automotive band (e.g., between 76 GHz and 81 GHz). The spectrum occupancy representation can differ in other examples.

In some embodiments, the spectrum occupancy representation is determined via a broadband high speed digital sampling cluster. In other embodiments, a processing unit may determine the spectrum occupancy representation via a narrowband fast ramping cluster and/or an integrated radar transceiver chip configured to emulate a narrowband fast ramping cluster.

At block 606, method 600 involves adjusting operation of the vehicle radar system based on the spectrum occupancy representation. For example, a processing unit may identify available spectral regions based on the spectrum occupancy representation. Particularly, the available spectral regions differ from the one or more spectral regions occupied by the electromagnetic energy measured from other emitters. The vehicle radar system may subsequently cause one or more radar units from the vehicle radar system to transmit radar signals in the available spectrum region. For instance, the vehicle radar system may adjust operation from a first spectral region to a second spectral region based on the available spectral regions (e.g., adjust frequency of operations for transmitting and receiving radar).

In some cases, a processing unit may identify a pattern of interference that reduces interference with the electromagnetic energy radiating in the environment based on the spectrum occupancy representation. The vehicle radar system may subsequently reduce interference with other vehicle radar systems by transmitting radar signals based on the pattern of interference identified by the processing unit.

In some embodiments, the vehicle radar system may use multiple receive apertures (antennas) to receive electromagnetic waves (e.g., radar signals) emitted from other emitters within the environment. Receiving radar signals using multiple apertures can enable a processing unit to process the signals using a TDOA technique and/or FDOA technique to determine a geolocation of an emitter of the radar signals within the environment relative to the vehicle. The vehicle may be subsequently controlled based at least in part on the geolocation of the emitter.

In some examples, method 600 may further involve capturing a first image of the emitter using a camera coupled to the vehicle based on the geolocation of the emitter and determining that the emitter corresponds to a first vehicle based on the first image. Method 600 may also involve identifying a vehicle type for the first vehicle, assigning a particular spectral region to the vehicle type based on subsequent electromagnetic energy received by one or more radar units oriented towards the first vehicle, and storing, in memory, a signature for the vehicle type that indicates at least the particular spectral region (e.g., a particular frequency or range of frequencies). In examples, method 600 may involve identifying the type of radar using one or more techniques. For instance, method 600 may involve identifying the type of radar based on emissions only, based on images of one or more vehicles only (e.g., a library of radar types associated with vehicle types) and/or a combination of the techniques (e.g., images and measurements of emissions).

During subsequent navigation of the vehicle, a processing unit may receive a second image representing a second vehicle from the camera coupled to the vehicle and determine a vehicle type for the second vehicle matches the vehicle type for the first vehicle. Based on the signature stored for the vehicle type, the processing unit may adjust operation of the vehicle radar system such that subsequent radar signals transmitted by the vehicle radar system are on a given spectral region that differs from the particular spectral region. In some instances, the processing unit may adjust operation of the vehicle radar system such that subsequent radar signals transmitted by the vehicle radar system are on the given spectral region that differs from the particular spectral region without measuring one or more radar signals transmitted by a second vehicle radar system corresponding to the second vehicle.

In some examples, a processing unit may update the signature for an emitter. Based on subsequent electromagnetic energy received by the one or more radar units oriented towards the first vehicle, the processing unit may update the signature for a vehicle type such that the signature indicates one or more parameters, such as a modulation duration, linear frequency modulated (LFM) waveform slope, and/or ramp repetition rate associated with the emitter (e.g., the vehicle type). In addition, the processing may determine the signature for a vehicle type to indicate a phase-coded waveform corresponding to the vehicle type.

In some embodiments, a processing unit may receive sensor data from a sensor coupled to the vehicle and detect a second vehicle positioned within a threshold distance from the vehicle based on the sensor data. The threshold distance may depend on the environment and/or the likelihood of interference between the vehicle radar systems corresponding to each vehicle. As such, the processing unit may switch the vehicle radar system to the passive receive-only mode in response to detecting the second vehicle positioned within the threshold distance from the vehicle.

Figure 7:
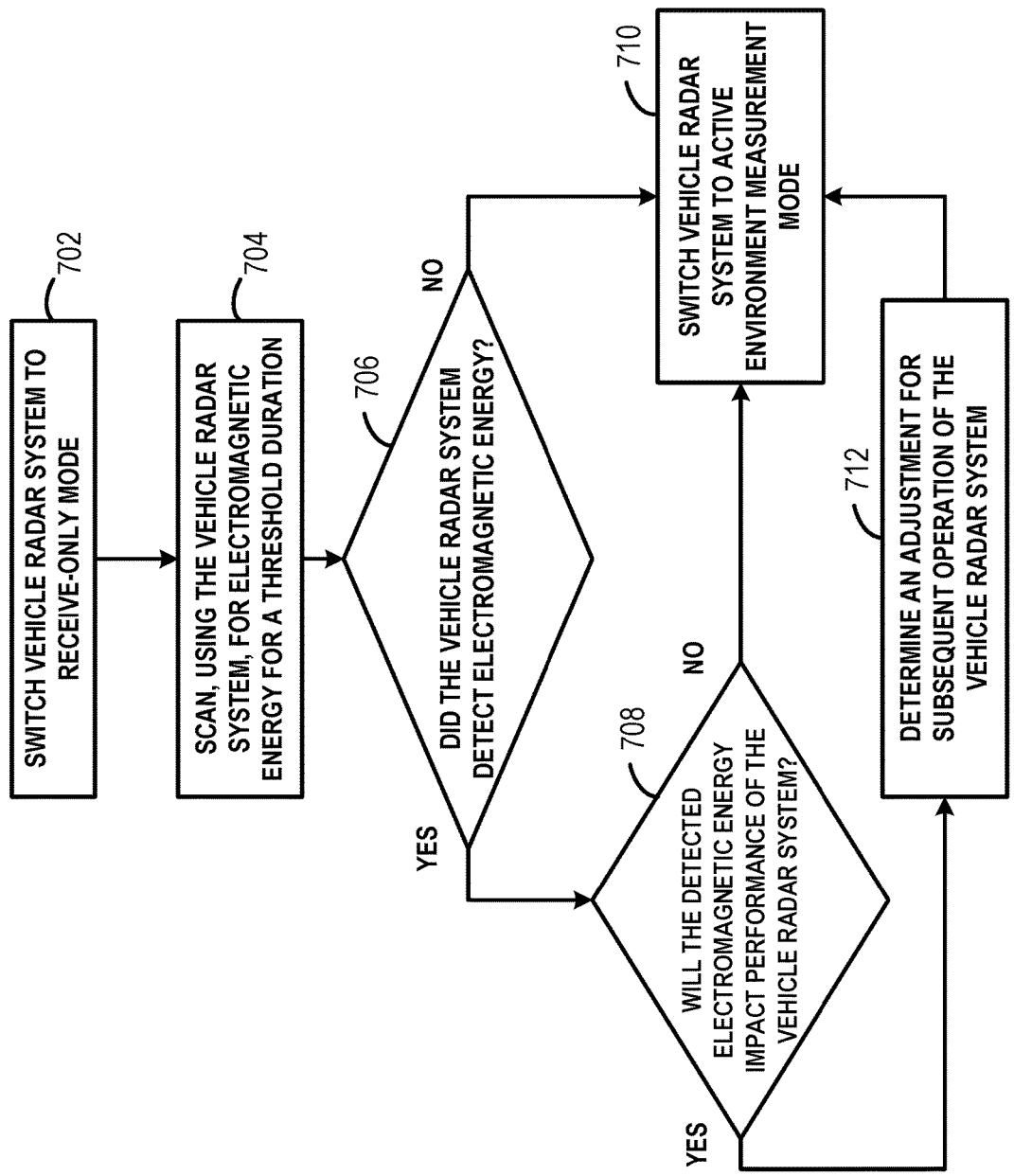
FIG. 7 is a flow chart of another method for implementing an interference reduction technique, according to example embodiments.

FIG. 7 illustrates another method for implementing a radar interference reduction technique, according to one or more example embodiments. Similar to method 600 shown in FIG. 6, method 700 may include one or more operations, functions, or actions, as depicted by one or more of blocks 702, 704, 706, 708, 710, and 712, each of which may be carried out by any of the systems shown in prior figures, among other possible systems.

At block 702, method 700 involves switching the vehicle radar system to a receive-only mode. A computing device on the vehicle (or a remotely positioned computing device) may cause the vehicle radar system to switch to the receive-only mode to enable one or more radar units to receive electromagnetic waves in the environment that originated from other emitters, such as from other vehicle radar systems. The receive-only mode may enable the vehicle radar system to differentiate between reflections that correspond to radar signals transmitted by the vehicle radar system itself and radar signals that originate from an external emitter. In some examples, the vehicle radar system may be configured to periodically switch to the receive-only mode.

In addition, in some embodiments, the vehicle radar system may switch to the receive-only mode in response to sensor data from another vehicle. For instance, the camera may indicate the presence of another vehicle, which may trigger the vehicle radar system to switch to the receive-only mode.

At block 704, method 700 involves scanning, using the vehicle radar system, for electromagnetic energy radiating in the environment for a threshold duration. The threshold duration can differ within examples. For instance, the duration could be a few seconds (e.g., 5 seconds) or a longer duration (e.g., 60 seconds).

At block 706, method 700 involves determining whether the vehicle radar system detects electromagnetic energy while in the receive-only mode or not. If the vehicle radar system detected electromagnetic energy, a processing unit may be used to further determine if the detected electromagnetic energy will likely impact performance of the vehicle radar system at block 708 of method 700. For example, the processing unit may compare the spectral region of the detected electromagnetic energy with the spectral region that the vehicle radar system is configured to use when transmitting and receiving radar signals. The determination performed at block 708 may involve various factors within examples, such as the direction and speed of travel of the emitter relative to the vehicle configured with the vehicle radar system in the receive-only mode.

In some cases, the processing unit may determine that interference may be temporary or minimal. In these cases, method 700 may involve switching the vehicle radar system to an active environment measurement mode (e.g., standard operation) at block 710, which can enable radar measurements of the environment to be captured and subsequently used for object detection and other navigation-related operations.

In other cases, the processing unit may determine that the electromagnetic energy from the other emitters is likely to impact the performance of the vehicle radar system when the vehicle radar system attempts to transmit and receive radar signals in that area. In these cases, the processing unit may determine one or more adjustments for implementing during subsequent operation of the vehicle radar system at block 712. For instance, the processing unit may adjust the spectral region used by the vehicle radar system to avoid interference with signals transmitted by the nearby emitter or emitters. Alternatively, the processing unit may identify and use a pattern of interference that can minimize interference with the other emitter or emitters. The processing unit may cause the vehicle radar system to adjust timing associated with radar transmissions. Other parameters may also be adjusted, such as the antenna polarization used, the time slots, the radio channels, signal processing algorithms, and/or coding techniques.

After determining the adjustments, method 700 may involve switching the vehicle radar system to the environment measurement mode at block 710 and causing the vehicle radar system to operate according to the adjustments determined at block 712. In some examples, the adjustments may be implemented by the vehicle radar system for a threshold duration before switching back to a preset configuration. For example, the adjustments may be utilized until vehicle cameras indicate that the other emitter (e.g., another vehicle) is no longer positioned by the vehicle.

Figure 8:
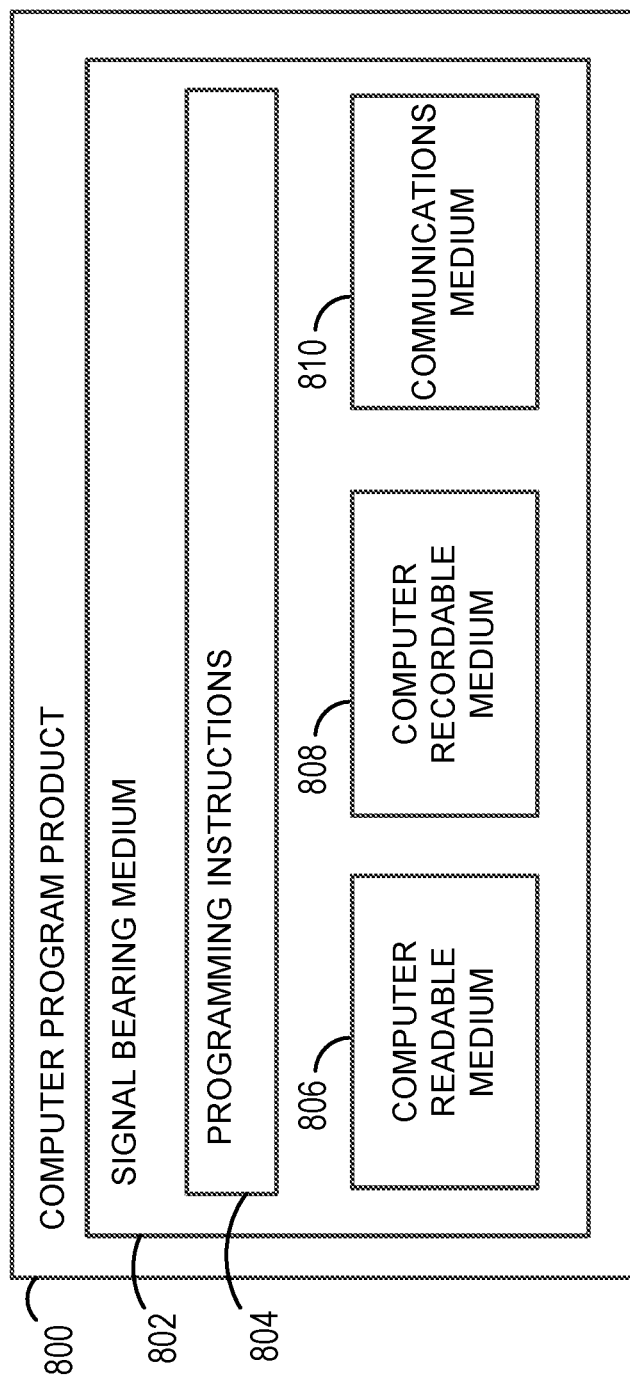
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.).

Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing system coupled to a first vehicle, sensor data representing an environment of the first vehicle, wherein the sensor data is received from one or more non-radar sensors coupled to the first vehicle;
   based on the sensor data, detecting a second vehicle positioned within a threshold distance from the first vehicle;
   in response to the detection, switching a vehicle radar system used by the first vehicle from an environment measure mode to a passive receive-only mode for a threshold duration;
   while the vehicle radar system is operating in the passive receive-only mode, receiving, at the computing system, information relating to electromagnetic energy radiating in the environment of the first vehicle and detected using the vehicle radar system, wherein at least a portion of the electromagnetic energy originated from the second vehicle;
   based on the information relating to the electromagnetic energy, determining a spectrum occupancy representation that indicates one or more spectral regions occupied by the electromagnetic energy;
   identifying a vehicle type for the second vehicle;

assigning at least one spectral region of the one or more spectral regions occupied by the electromagnetic energy to the vehicle type based on subsequent electromagnetic energy received by one or more radar units oriented toward the second vehicle; and adjusting, by the computing system, operation of the vehicle radar system based on the spectrum occupancy representation, wherein adjusting operation of the vehicle radar system comprises operating outside the at least one spectral region.

2. The method of claim 1, wherein switching the vehicle radar system to the passive receive-only mode for the threshold duration comprises:

switching the vehicle radar system to the passive receive-only mode for the threshold duration based on a predefined cycle, wherein the predefined cycle indicates when to switch the vehicle radar system between the environment measure mode and the passive receive-only mode.

3. The method of claim 1, wherein determining the spectrum occupancy representation comprises:

determining the spectrum occupancy representation based on a spectral range between 76 Gigahertz (GHz) and 81 GHz, inclusive.

4. The method of claim 1, further comprising:

receiving, by the vehicle radar system, the electromagnetic energy via a plurality of receive apertures;

based on receiving the electromagnetic energy via the plurality of receive apertures, determining a geolocation of an emitter that transmitted the electromagnetic energy using a Time Difference of Arrival (TDOA) technique or a Frequency Difference of Arrival (FDOA) technique; and controlling the first vehicle based at least in part on the geolocation of the second vehicle.

5. The method of claim 4, further comprising:

based on the geolocation of the second vehicle, capturing a first image of the second vehicle using a camera coupled to the first vehicle;

identifying the vehicle type for the second vehicle based on the first image; and storing, in memory, a signature for the vehicle type that indicates the at least one spectral region.

6. The method of claim 5, further comprising:

receiving, during subsequent navigation of the first vehicle, a second image representing a third vehicle from the camera coupled to the first vehicle;

determining a vehicle type for the third vehicle matches the vehicle type for the second vehicle; and based on the signature stored for the vehicle type for the second vehicle, adjusting operation of the vehicle radar system such that subsequent radar signals transmitted by the vehicle radar system are on a given spectral region that differs from the at least one spectral region.

7. The method of claim 6, wherein adjusting operation of the vehicle radar system such that subsequent radar signals transmitted by the vehicle radar system are on the given spectral region that differs from the at least one spectral region is performed without measuring one or more radar signals transmitted by a second vehicle radar system corresponding to the third vehicle.

8. The method of claim 1, further comprising:

based on the subsequent electromagnetic energy received by the one or more radar units oriented towards the second vehicle, generating a signature for the vehicle type such that the signature indicates a modulation duration, linear frequency modulated (LFM) waveform slope, and ramp repetition rate.

9. The method of claim 1, further comprising:

based on the subsequent electromagnetic energy received by the one or more radar units oriented towards the second vehicle, generating a signature for the vehicle type such that the signature indicates a phase-coded waveform corresponding to the vehicle type.

10. The method of claim 1, further comprising:

based on the spectrum occupancy representation, identifying available spectral region that differs from the one or more spectral regions occupied by the electromagnetic energy; and wherein adjusting operation of the vehicle radar system based on the spectrum occupancy representation comprises:

causing one or more radar units from the vehicle radar system to subsequently transmit radar signals using the available spectral region.

11. The method of claim 1, further comprising:

based on the spectrum occupancy representation, identifying a pattern of interference that reduces interference with the electromagnetic energy radiating in the environment; and wherein adjusting operation of the vehicle radar system based on the spectrum occupancy representation comprises:

causing one or more radar units from the vehicle radar system to transmit radar signals based on the pattern of interference.

12. The method of claim 1, wherein determining the spectrum occupancy representation involves using broadband high speed digital sampling clustering.

13. The method of claim 1, wherein determining the spectrum occupancy representation involves using narrowband fast ramping clustering.

14. The method of claim 1, wherein determining the spectrum occupancy representation involves using an integrated radar transceiver chip configured to emulate narrowband fast ramping clustering.

15. The method of claim 1, wherein switching the vehicle radar system used by the first vehicle from the environment measure mode to the passive receive-only mode comprises:

switching the vehicle radar system from the environment measure mode to the passive receive-only mode further when the first vehicle is not moving.

16. The method of claim 1, wherein switching the vehicle radar system used by the first vehicle from the environment measure mode to the passive receive-only mode comprises:

switching a first radar unit and a second radar unit from the environment measure mode to the passive receive-only mode, wherein the first radar unit is forward-facing and coupled at a front portion of the first vehicle and the second radar unit is side-facing and coupled at a side portion of the first vehicle.

17. The method of claim 1, wherein determining the spectrum occupancy representation that indicates one or more spectral regions occupied by the electromagnetic energy comprises:

inputting the information relating to the electromagnetic energy radiating in the environment of the first vehicle into a neural network, wherein the neural network outputs the spectrum occupancy representation based on the information relating to electromagnetic energy radiating in the environment.

18. A system comprising:
a first vehicle having a vehicle radar system and one or more non-radar sensors; and
a computing device coupled to the first vehicle, wherein the computing device is configured to:
 receive sensor data representing an environment of the first vehicle, wherein the sensor data is received from the one or more non-radar sensors;
 based on the sensor data, detecting a second vehicle positioned within a threshold distance from the first vehicle;
 in response to the detection, switch the vehicle radar system from an environment measure mode to a passive receive-only mode for a threshold duration;
 while the vehicle radar system is operating in the passive receive-only mode, receive information relating to electromagnetic energy radiating in the environment of the first vehicle and detected using the vehicle radar system, wherein at least a portion of the electromagnetic energy originated from the second vehicle;
 based on the information relating to the electromagnetic energy, determine a spectrum occupancy representation that indicates one or more spectral regions occupied by the electromagnetic energy;
 identify a vehicle type for the second vehicle;
 assign at least one spectral region of the one or more spectral regions occupied by the electromagnetic energy to the vehicle type based on subsequent electromagnetic energy received by one or more radar units oriented toward the second vehicle; and
 adjust operation of the vehicle radar system based on the spectrum occupancy representation, wherein adjusting operation of the vehicle radar system comprises operating outside the at least one spectral region.

19. The system of claim 18, wherein the computing device is further configured to:
 switch the vehicle radar system to the environment measure mode; and
 wherein the computing device is configured to adjust operation of the vehicle radar system based on the spectrum occupancy representation after switching the vehicle radar system to the environment measure mode.

20. A non-transitory computer-readable medium configured to store instructions, that when executed by a computing system comprising one or more processors, causes the computing system to perform operations comprising:
 receiving sensor data representing an environment of a first vehicle, wherein the sensor data is received from one or more non-radar sensors coupled to the first vehicle;
 based on the sensor data, detecting a second vehicle within a threshold distance from the first vehicle;
 in response to the detection, switching a vehicle radar system used by the first vehicle from an environment measure mode to a passive receive-only mode for a threshold duration;
 while the vehicle radar system is operating in the passive receive-only mode, receiving information relating to electromagnetic energy radiating in the environment of the first vehicle and detected using the vehicle radar system, wherein at least a portion of the electromagnetic energy originated from the second vehicle;
 based on the information relating to the electromagnetic energy, determining a spectrum occupancy representation that indicates one or more spectral regions occupied by the electromagnetic energy;
 identifying a vehicle type for the second vehicle;
 assigning at least one spectral region of the one or more spectral regions occupied by the electromagnetic energy to the vehicle type based on subsequent electromagnetic energy received by one or more radar units oriented toward the second vehicle; and
 adjusting operation of the vehicle radar system based on the spectrum occupancy representation, wherein adjusting operation of the vehicle radar system comprises operating outside the at least one spectral region.

* * * * *